United States Patent
Arthurs et al.

(10) Patent No.: US 8,726,167 B2
(45) Date of Patent: May 13, 2014

(54) DISPLAY AND INSTALLATION OF PORTLETS ON A CLIENT PLATFORM

(75) Inventors: Brendan Arthurs, Malahide (IE); Stanley K. Jerrard-Dunne, Leopardstown (IE); Kieran J. O'Mahony, Faha (IE); Charles R. E. Smith, Celbridge (IE)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 12/644,235

(22) Filed: Dec. 22, 2009

(65) Prior Publication Data

US 2010/0115432 A1    May 6, 2010

Related U.S. Application Data

(62) Division of application No. 11/568,213, filed on Oct. 23, 2006, now Pat. No. 7,703,022.

(30) Foreign Application Priority Data

Sep. 17, 2004 (GB) ................................ 0420675
Sep. 17, 2004 (GB) ................................ 0420679
Sep. 14, 2005 (WO) ................. PCT/EP2005/054569

(51) Int. Cl.
*G06F 3/00* (2006.01)
*G06F 17/00* (2006.01)
*G06F 3/048* (2013.01)

(52) U.S. Cl.
USPC ............ 715/742; 715/744; 715/745; 715/746

(58) Field of Classification Search
CPC ............ G06F 3/00; G06F 3/048; G06F 17/00
USPC ......... 715/762–765, 733, 738, 742, 744, 749; 709/210, 219; 717/100, 108
See application file for complete search history.

(56) References Cited

U.S. PATENT DOCUMENTS 7,502,833 B2 * 3/2009 Schaeck ........................ 709/217
2001/0009016 A1 * 7/2001 Hofmann et al. ............. 709/219

(Continued)

FOREIGN PATENT DOCUMENTS

JP    2002063108 A    2/2002
JP    2002300654 A    10/2002

(Continued)

OTHER PUBLICATIONS

Chung T Nguyen, :Creating Mobile Portlets with WebSphere Portal Application Integreator, Mar. 2003.*

(Continued)

*Primary Examiner* — Tadeese Hailu
(74) *Attorney, Agent, or Firm* — Edward Choi; Hoffman Warnick LLC

(57) ABSTRACT

A client computer system, method and software tool for displaying portlet content are provided. The system comprises a user interface, a portlet server and a portlet view tool. The user interface allows the display of a page including one or more view window(s), each displaying content provided by a component of the computer system. The portlet server processes requests for portlet content, and has one or more portlet(s) installed thereon. The portlet view tool is associated with a portlet installed on the portlet server, and controls the associated portlet. A web browser is used to display content from the associated portlet in a view window on the display.

8 Claims, 8 Drawing Sheets

(56) References Cited

U.S. PATENT DOCUMENTS

| | | | |
|---|---|---|---|
| 2002/0005522 A1* | 1/2002 | Miyokawa et al. | 257/79 |
| 2004/0098451 A1* | 5/2004 | Mayo | 709/203 |
| 2004/0098467 A1* | 5/2004 | Dewey et al. | 709/219 |
| 2005/0010634 A1* | 1/2005 | Henderson et al. | 709/201 |
| 2005/0198201 A1* | 9/2005 | Bohn et al. | 709/218 |
| 2005/0198615 A1 | 9/2005 | Choi et al. | |
| 2005/0256940 A1* | 11/2005 | Henderson et al. | 709/219 |
| 2005/0278698 A1* | 12/2005 | Verco | 717/116 |
| 2006/0041637 A1 | 2/2006 | Jerrard-Dunne | |

FOREIGN PATENT DOCUMENTS

| | | |
|---|---|---|
| JP | 2004078276 A | 3/2004 |
| JP | 2004220374 A | 8/2004 |
| WO | WO 2006/030015 A2 | 3/2006 |

OTHER PUBLICATIONS

PCT, "Notification of Transmittal of the International Search Report and the Written Opinion of the International Searching Authority, or the Declaration", International Application No. PCT/EP2005/054569, International Filing Date Sep. 14, 2005.

Shu et al., "Building JSR 168-Compliant Portlets with Sun Java Studio Enterprise", Sun Developer Network, May 21, 2004, pp. 1-19.

U.S. Appl. No. 11/568,213, "Office Action", May 26, 2009, pp. 1-10.

U.S. Appl. No. 11/568,213, "Amendment", Aug. 24, 2009, pp. 1-11.

Westbay, Michael, "Apache Pluto Tutorial", WEB + DB Press, Japan, Gijyutsuhyoron-sha, Aug. 1, 2004, vol. 21, First Edition, pp. 120-132.

JP Patent Application No. 2007-531747, Office Action Communication, Partial translation, May 31, 2011, 1 page.

Hailu, U.S. Appl. No. 11/568,213, Notice of Allowance & Fees Due, Dec. 3, 2009, 7 pages.

Katrin Sommermeyer, PCT Notification of Transmittal of the International Search Report and the Written Opinion of the International Searching Authority, or the Declaration, Date of Mailing Apr. 10, 2006, 17 pages.

Dave Springgay, Creating an Eclipse View, Copyright 2001, Object Technology International, Inc., 16 pages.

Ann Fred et al., The case for portlets, Feb. 1, 2003, 8 pages.

David B. Lection, Portal Toolkit for WebSphere Portal, Webshere Developer Journal, vol. 1, No. 7, Aug. 21, 2002, 10 pages.

Object Technology International Inc., "Eclipse Platform Technical Overview," Feb. 2003, pp. 1-20.

Phillips, "Developing and Debugging Portlets Using the IBM Portal Toolkit Plug-in for WebSphere Studio Application Developer," Oct. 2002, 18 pages, IBM Developer Technical Support Center.

IBM, "Optimizing and Minimizing Portlet Round Trips to a Portal Server," Sep. 2001, pp. 1-4, ip.com, IP.com Number:IPCOM000015059D.

SYNYA MYAMA, Information Materials for IDS, JPO Office Action, May 31, 2011, 2 pages.

\* cited by examiner

DISPLAY AND INSTALLATION OF PORTLETS ON A CLIENT PLATFORM

REFERENCE TO PRIOR APPLICATION

This application is a divisional application of co-pending U.S. utility patent application Ser. No. 11/568,213, which was filed on Oct. 23, 2006, and which is hereby incorporated by reference.

FIELD OF THE INVENTION

The present invention relates to the field of data processing and in particular to the display and installation of portlets on a client platform.

BACKGROUND OF THE INVENTION

The World Wide Web is the Internet's multimedia information retrieval system. In the web environment, client machines communicate with web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called web browsers, for example, Netscape Navigator (Netscape Navigator is a registered trademark of Netscape Communications Corporation) or Microsoft Internet Explorer (Microsoft and Internet Explorer are trademarks of Microsoft Corporation), which are applications running on a client machine, enable users to access information by specification of a link via the URL and to navigate between different HTML pages.

When the user of the web browser selects a link, the client machine issues a request to a naming service to map a hostname (in the URL) to a particular network IP (Internet Protocol) address at which the server machine is located. The naming service returns an IP address that can respond to the request. Using the IP address, the web browser establishes a connection to the server machine. If the server machine is available, it returns a web page. To facilitate further navigation within the site, a web page typically includes one or more hypertext references ("HREF") known as "anchors" or "links".

A portal is usually a web application which aggregates content from various different sources and presents it within a portal web page, and may have sophisticated personalization features to provide customized content to users. The portal application can provide a gateway to one or more backend software applications and is often provided on a separate portal server.

The portal server typically arranges web content into a portal page containing one or more portlets. A portlet is a web component, managed by a portlet container, which processes and generates dynamic web content. This content, often called a fragment, can be aggregated by the portal with content from other portlets to form the portal page. The content generated by a portlet may vary from one user to another depending on the user configuration for the portlet.

The portal provides a navigation framework for a set of web pages arranged on the server in a hierarchy. This framework provides a user interface allowing navigation through the hierarchy of pages that are available on the server. The user interface providing this navigation is known as a theme. Each page may contain zero or more portlets, the page arrangement being predetermined and constructed using design or administration tools.

With a standard server-side portal, a client web browser is used to view the aggregated output of several portlets on a single page. Users interact with content produced by the portlets, for example by submitting forms or following links, resulting in portlet actions being received by the portal. When an HTTP request is received by the portal server, it determines if the request contains an action targeted to any of the portlets associated with the portal page. If there is an action targeted to a portlet, the portal requests the portlet container to invoke the portlet to process the action. The portlet processes the action and generates a content fragment to be included in the new portal page. Additionally, all other portlets on the requested portal page refresh and pass a content fragment to the portal. The portal packages each portlet content fragment in a portlet window adding a title and control buttons to each window. This is sometimes called 'wrapping' each supplied content fragment, and the additional markup used to wrap the fragment is called a 'skin'. The skin may include control buttons which may be used, for example, to place the portlet into a specific mode like edit or configure, or to change the display state of the portlet into a maximized or minimized visual state, like you would see in a common windowing system. Then the portal aggregates the portlet windows into a complete portal page, for sending to the client. The web browser renders the code on a display screen of the client.

Navigation to a page served by the portal can be through the navigation framework provided by the theme if a user starts out with a URL to the portal home page, or via URL links to specific pages, or via URL links to an instance of a portlet; in the latter case the portal serves up the complete page containing that portlet.

Many companies have made large investments in the development of portlets to meet their business requirements. At present these are purely server-side applications, accessible only using a client web browser, and generally only while connected to the portal server via some form of network. It would be greatly beneficial for users to be able to continue to use those same portlets while not connected to the network. This could be achieved by rewriting the portlets as standalone applications for deployment on the client side. However, this would require modification of all portlets to allow them to run as standalone applications, which would be a costly and time consuming undertaking likely to discourage a move from server to client side. The present invention aims to address these problems.

SUMMARY OF THE INVENTION

According to a first aspect of the present invention, there is provided a method for installing a portlet in a client platform are provided. The client platform has a user interface for displaying a page including one or more view window(s) each displaying content provided by a component of the computer system. A portlet server for processing requests for portlet content is provided. In response to user selection of a portlet, the selected portlet is installed on the portlet server, and a portlet view tool associated with the selected portlet is generated. The portlet view tool is operable to run a web browser for displaying content from its associated portlet in a view window and to control the associated portlet.

The method may also comprise any of the following steps: providing one or more files each containing at least one portlet; displaying a list of these files for user selection; and detecting a user selection According to a second aspect of the invention, there is provided a software tool for installing a portlet in a client platform provided with a portlet server. The tool is operable to provide A software tool for installing a portlet in a client computer system with one or more portlet server(s), the tool being operable to provide data identifying one or more files each containing at least one portlet. In response to selection of a portlet for installation the tool instructs a portlet server to install the selected portlet and generates a portlet view tool associated with the selected portlet. The portlet view tool is operable to run a web browser for displaying content from its associated portlet; and to control the associated portlet According to another aspect of the present invention there is provided a client computer system comprising a user interface, which allows the display of views contributed by plug-ins registered with the client platform, at least one portlet server for serving up web content from a portlet installed thereon, a portlet view plug-in associated with a portlet installed on the portal server, and a portlet view tool including a web browser module; wherein the portlet view plug-in includes identification data for the portlet instance on the portlet server, and is configured to contribute a view to the client platform using the portlet view tool, the view displaying web content from the portlet using the web browser module.

The client computer system may also comprise one or more files each containing at least one portlet.

According to a further aspect of the invention, there is provided a method of displaying portlet content on a display page using a client computer system. The method comprises the steps of providing a user interface for displaying a page including one or more view window(s) each displaying content provided by a component of the computer system, and providing a portlet server for processing requests for portlet content, the portlet server having one or more portlet(s) installed thereon. On selection of a portlet for display, a view window is provided on the display page and a web browser is run therein. Web content is requested from the selected portlet via the web browser and displayed on the display page in the view window provided.

According to yet another aspect of the invention, there is provided a software tool for use with a client computer system comprising a user interface for displaying a page including one or more view window(s) each displaying content provided by a component of the computer system, and a portlet server for processing requests for portlet content, the portlet server having one or more portlet(s) installed thereon. The software tool comprising a portlet view tool, associated with a portlet installed on the portlet server, operable to control the associated portlet and to run a web browser for displaying content from its associated portlet in a view window The portal aggregation model used in prior art systems is not applied. Instead, a separate view window is associated with each portlet. A web browser is run in each of these views. The browser in a portlet view is directed to navigate to the page associated with that portlet, thus displaying the portlet's output. All communication between the user and the portlet then takes place using HTTP via the embedded browser. Requests to change the mode or state of the portlet can be made through the portlet view tool and these are conveyed to the portlet by redirecting the browser associated with that portlet to a particular URL.

Embodiments of the invention allow an unmodified portlet to run inside a window on a rich client platform (also referred to as smart client, fat client or thick client), which is a client that performs most of the processing with little or no processing being performed by the server. Control of the portlet is moved from the portlet markup to the client UI. From the user's point of view, there is no difference between a portlet and any other client side application. A user can interact with the portlet in exactly the same way as they would have interacted with it had it been deployed as a server side portlet. Portlets can be installed into the client using a simple wizard system and removed similarly. Thus, client side support for portlets is provided, allowing them to be run locally in a rich client environment, removing the need for a separate server and network connections. This will allow business to leverage their investment in server side portlets without requiring any modification to the portlet code which has already been written.

BRIEF DESCRIPTION OF THE DRAWINGS

An embodiment of the present invention will now be described by way of example only, with reference to the accompanying drawings.

DETAILED DESCRIPTION OF THE INVENTION

Figure 1:
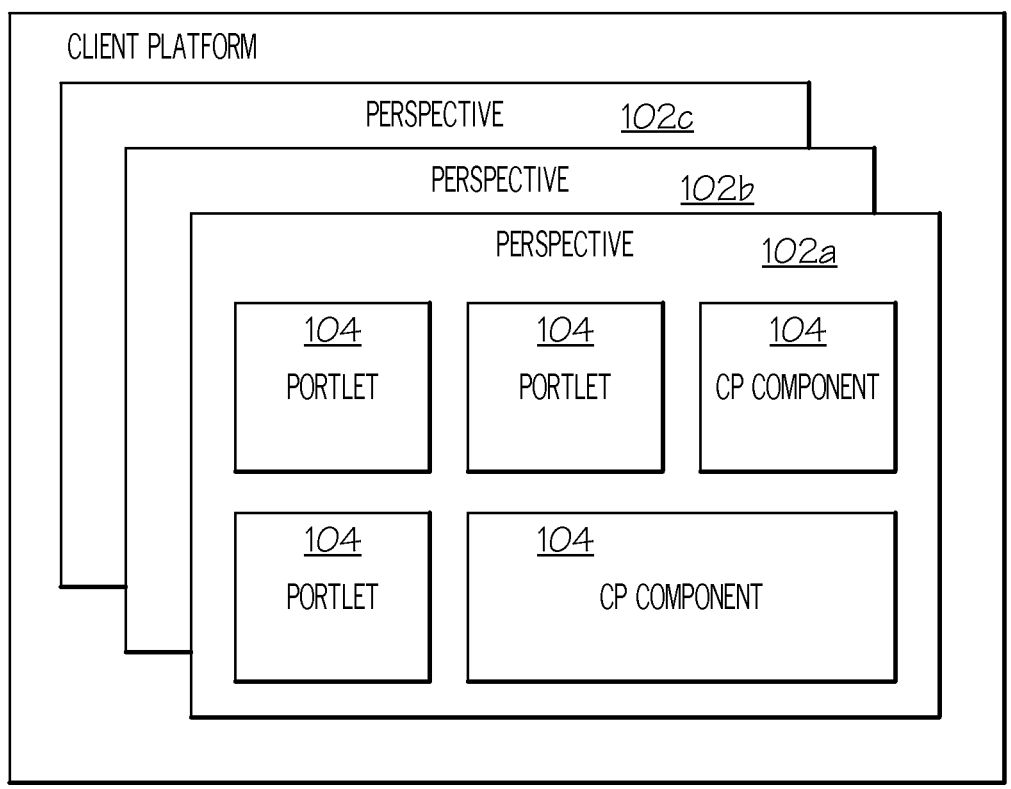
FIG. 1 illustrates an example of a display of a client platform.

In the following description, reference is made to the accompanying drawings which form a part hereof and which illustrate one implementation. It is understood that other implementations may be utilized and structural and operational changes may be made without departing from the scope of the invention.

In our client side approach, a separate view window is associated with each portlet and a web browser is run inside each of these view windows. The browser in a portlet view is directed to navigate to the page associated with that portlet, thus displaying the portlet's output. All communication between the user and the portlet then takes place using HTTP via the embedded browser. Requests to change the mode or state of the portlet can be made through the client platform UI and these are conveyed to the portlet by redirecting the browser associated with that portlet to a particular URL.

An embodiment of the present invention uses a client platform based on Eclipse technology which provides source code building blocks, plug-in frameworks and running examples that smooth the progress of application tools development. It is an environment for creating, integrating and deploying modules, called plug-ins, which may be tools for use across a range of computing environments.

The Eclipse platform defines a Workbench User Interface (UI) and a set of common domain-independent user interaction paradigms that tool builders plug into to add new capabilities. The platform comes with a set of standard views which can be extended by tool builders. Tool builders can both add new views, and plug new domain-specific capability into existing views A tool is written as a plug-in that operates on files in Eclipse's file space, called the Workspace, and surfaces its tool-specific UI in the Workbench. When the Eclipse platform is launched, the user is presented with the Workbench window display page which provides an integrated development environment composed of the set of available plug-ins.

Eclipse will run on a wide range of operating systems including Linux™ and Windows™, (Microsoft and Windows are trademarks of Microsoft Corporation in the United States, other countries, or both and Linux is a trademark of Linus Torvalds in the United States, other countries, or both).

The Eclipse platform is described in the Eclipse Platform Technical Overview by Object Technology International Inc, which can be found, for example, at www.eclipse.org, and which is incorporated herein by reference.

The Eclipse platform includes a plugins folder where individual plug-ins are deployed. Each plug-in is installed in its own folder under the plugins folder. A plug-in is described in an XML manifest file, called plugin.xml, residing in the plug-in's folder. The manifest file declares the plug-in's interconnections to other plug-ins and tells the Eclipse platform what it needs to know to activate the plug-in. The parsed contents of plug-in manifest files are made available programmatically through a plug-in registry API and parsed plug-in specifications are cached in an in-memory repository called the plug-in registry.

The Eclipse platform provides a plug-in management kernel and certain core plug-ins that are present in every Eclipse deployment. The identities of these core plug-ins are hard-coded into the Eclipse platform, and the platform knows to activate these plug-ins in each running instance of Eclipse. Non-core plug-ins, on the other hand, are activated when required by other plug-ins.

The interconnection model between plug-ins is simple: a plug-in declares any number of named extension points to which other plug-ins can contribute, and any number of extensions which it contributes to one or more extension points of other plug-ins. A plug-in's extensions can be extended by other plug-ins. An extension point may have a corresponding API interface. Other plug-ins contribute implementations of this interface via extensions to this extension point.

The Eclipse Platform Plug-in Manifest Specification, which is incorporated herein as Annex 1, documents the XML elements and attributes used in defining plug-ins. Each plug-in has a unique identifier (XML attribute id), which is used to refer to a plug-in within the manifest files of other, related, plug-ins. The unique identifier may also be used within provider-supplied plug-in code to access a plug-in's running instance.

Installing a plug-in on the Eclipse platform comprises two stages. The first stage comprises copying the resources that constitute the plug-in (the manifest file, jar or war files, and other resources) into an individual folder for the plug-in, under the platform's 'plugins' directory. The second comprises registering the plug-in, by adding data from the plug-in's manifest file, e.g. a parsed plug-in specification, to the plug-in registry. Once this is done the plug-in can be activated by the Eclipse platform when the plug-in is required to perform some function.

The Eclipse platform User Interface (UI) paradigm is based on views and perspectives. Views are windows which display information about objects; and perspectives provide a display page or canvas on which views can be organized. Plug-ins may contribute views to the platform, and the views can be organized into different perspectives.

The Eclipse Workbench provides a number of extension points including a view extension point. Through this view extension point other plug-ins can contribute views to the platform, by providing one or more extensions to this extension point.

Referring to FIG. 1, there is shown a simple example of a display of a client platform having three different perspectives 102a, 102b, 102c. Perspective 102a is displayed uppermost and includes five views 104, three views displaying portlet content alongside two non-portlet views displaying other client platform components. Each of the views displaying portlet content is contributed by a portlet view plug-in as an extension of the Eclipse view extension point. The method of adding portlet views to an Eclipse perspective will be described later.

As has been mentioned in the preamble, portlets are typically run inside portal servers, which aggregate content from all portlets on a page, and return the aggregated content. In the present invention the portal server does not aggregate content from one portlet with that of another, but rather returns web content provided by a single portlet at a time. The term 'portlet server' is thus used herein, to indicate that the standard portal server process has been modified. As used herein the term 'portlet server' means a server process that uses a protocol such as HTTP to serve markup documents, and any associated files and scripts, from a portlet when requested. The present invention may be implemented with a single portlet server. However, currently several de-facto standards exist for writing portlets. An embodiment supports two (or more) of these standards, namely WebSphere™ portlets and the Java™ Specification Request (JSR)-168 Standard. WebSphere is a registered trademark of International Business Machines Corp. of Armonk, N.Y.

An embodiment provides portlet servers using modified versions of WebSphere Portal Server and JSR-168 Portal Server. The server process serves up a markup document from a single portlet, i.e. with no aggregation of content from different portlets. URLs address individual portlets and return the markup fragment for that portlet alone. The portal server code is cut down so as not to provide any themes, or skins or to perform wrapping of a portlet content fragment. Portal pages are replaced by Eclipse perspectives, with the ability to change perspectives in Eclipse providing the navigation across display pages, and a skin for a portlet content fragment being displayed on a display page is provided instead by a portlet view tool implemented as a plug-in to the Eclipse platform as will be explained below.

Additionally, the Tomcat Application server code and the WebSphere and JSR-168 portal server code is 'slimmed down' as much as possible so as not to include unnecessary functionality, such as server security features (login/authentication etc) which are not required in a client computer system.

The portlet servers are configured to provide for the installation of portlets, as well as to support portlet lifecycles (e.g. Init, Service and Destroy methods) and mode changes. The Init method allows the portlet to be initialized; the service method is called when the portlet is required to render its content; and the destroy method enables portlets to be taken out of service and destroyed.

An embodiment uses an embedded version of a Tomcat Java™ 2 Enterprise Edition (J2EE) application server to host the portlet servers. Tomcat is an open-source implementation of JavaServlet and JavaServer Pages™ technologies developed under the Jakarta project at the Apache Software Foundation (Java and all Java-based trademarks are trademarks of Sun Microsystems, Inc. in the United States, other countries, or both). Additionally, the Tomcat application server provides support for J2EE services such as database connections and Enterprise JavaBeans (EJBs). Other application servers, such as WebSphere Application Server, could equally well be used, as will be appreciated by one skilled in the art.

Figure 2A:
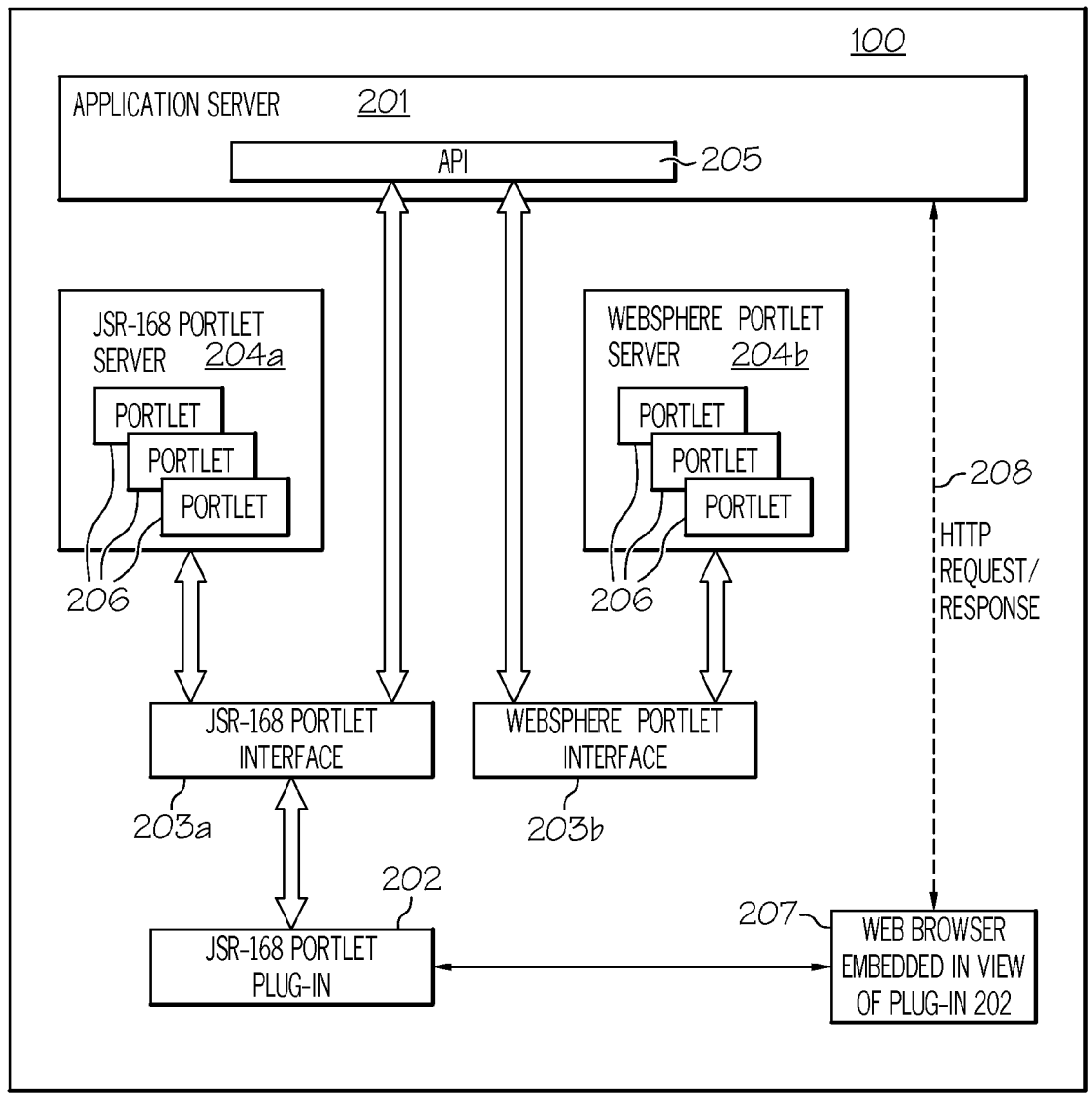
FIG. 2a shows an overview of the interactions between components of a system according to an embodiment of the invention.

FIG. 2a shows an overview of the interactions between components of a system according to an embodiment. The components include a Tomcat Application server 201 and Application server Interface (API) 205, a portlet server for each type of portlet to be supported, here a WebSphere portlet server 204b and a JSR-168 portlet server 204a, portlet interfaces 203a, 203b (which are implemented as part of the portlet servers), a JSR-168 portlet view plug-in 202, associated with one of the JSR-168 portlets 206 installed on the portlet servers 204a, and a web browser 207 which is running within a client view (not shown in FIG. 2a) contributed by the portlet view plug-in 202. The web browser communicates with the Tomcat server 201 using HTTP 208.

Figure 2B:
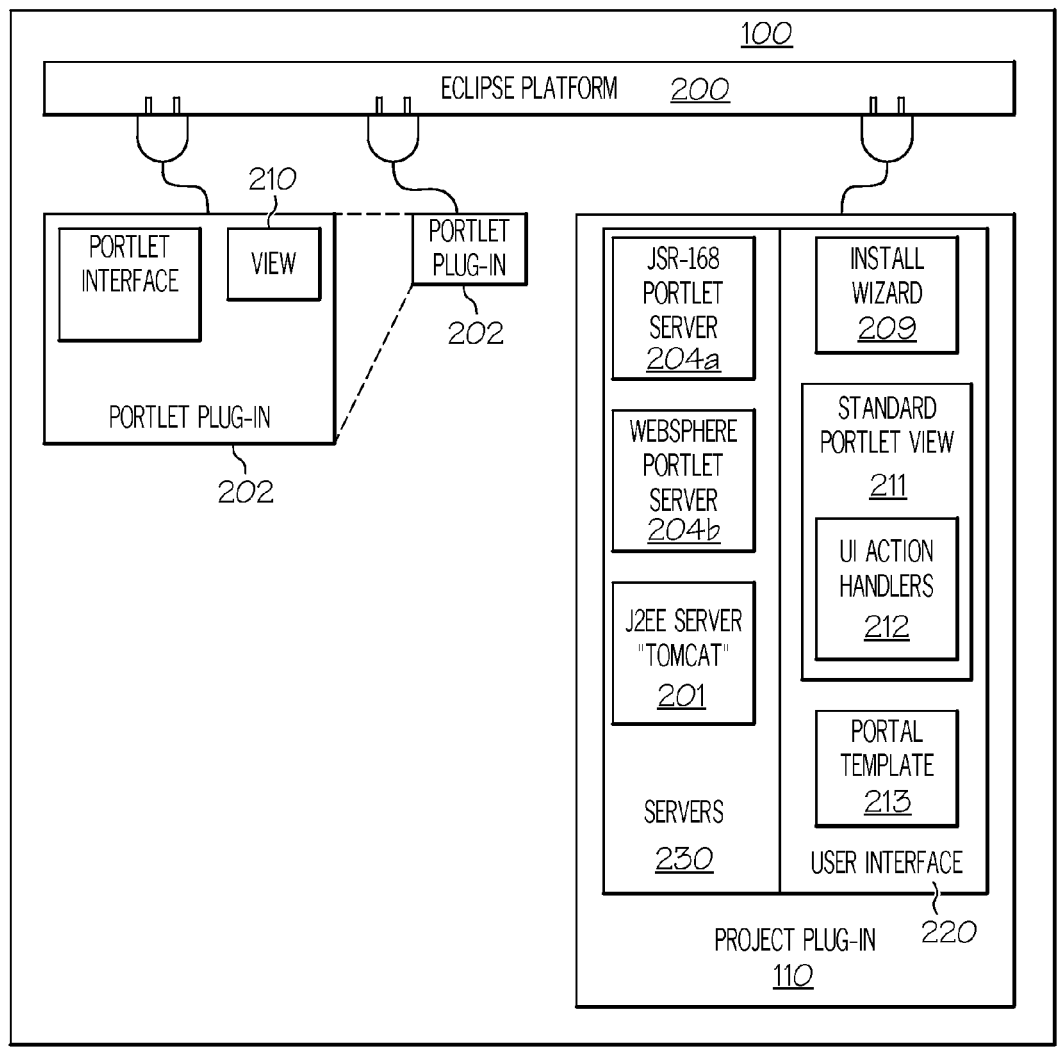
FIG. 2b illustrates a client plug-in architecture and its functional components in which the system of FIG. 2a can be implemented.

FIG. 2b shows the Eclipse plug-in architecture of an embodiment in which portlet view tools are provided as portlet view plug-ins. As shown the client system 100 comprises a plurality of portlet view plug-ins 202 (two shown) and a project plug-in 110. The project plug-in comprises the code which is used to implement the system and which includes a plurality of UI components 220 and a plurality of server components 230. (Although these are illustrated as forming a single plug-in 110 in FIG. 2b, these could be implemented in many separate plug-ins according to preference.) The UI components 220 include an install wizard 209, a wiring tool 215, a standard portlet view 211 which has a UI Action Handler 212, and a portal template 213. The standard portlet view code 211 is used by each portlet view plug-in to wrap its portlet content into a view window, provide control icons, run a web browser etc when a view of its associated portlet is to be displayed.

The portlet install wizard component 209 provides a portlet install menu and the implementation of an install wizard, which creates the portlet view plug-ins 202, and will be described later.

The standard portlet view 211 provides the code required by each portlet view plug-in to implement its view. This enables the portlet view tools to provide frames for the portlet views, portlet control icons for use on the view frames, and run a web browser in each portlet view. The UI Action Handler 212 contains code that is executed by the portlet view tool in response to users clicking on the portlet control icons to indicate a control action.

The portal template component 213 provides a default, initial perspective from which a user may select and open the portlet install wizard 209.

Each portlet installed by the install wizard onto the client is provided with its own associated portlet view plug-in 202. The questions of on which portlet server a portlet is installed, and to which portlet interface 203a,b the portlet interface extension 214 provided by the wizard refers, depend on the type of portlet being installed, i.e. whether it is a JSR-168 or WebSphere portlet.

The portlet view plug-in 202 on the left of FIG. 2b has been expanded to show its contents which are two extensions: namely a portlet interface extension 214, which connects to the servers via a user-defined server extension point 232, and a view extension 210, which extends the Eclipse view extension point. The view 210 references the standard portlet view 211 from which it obtains the code required to run the web browser 207. The web browser 207 can be used to receive web content via HTTP from the portlet server on which the plug-in's associated portlet instance exists. The portlet interface extension 214 contains access data for that portlet server and allows the view 210 to communicate with the associated portlet instance on the relevant portal server. The portlet interface extension 214 includes the name and id of its associated portlet and uses this to refer to the relevant portlet interface 203(a or b).

The portlet servers 204a and 204b are configured so that when a request for content of a portlet is received, the relevant portlet server, (i.e. the WebSphere portlet server for a WebSphere portlet and the JSR-168 portlet server for a JSR-168 portlet), returns only the content of that individual portlet without aggregating the content with content from other portlets and without packaging the content into a portlet window with title bar and control buttons etc.

The portlet's view plug-in uses a web browser to display this content inside the view window which the plug-in provides in accordance with the portlet's configuration data.

Figure 2C:
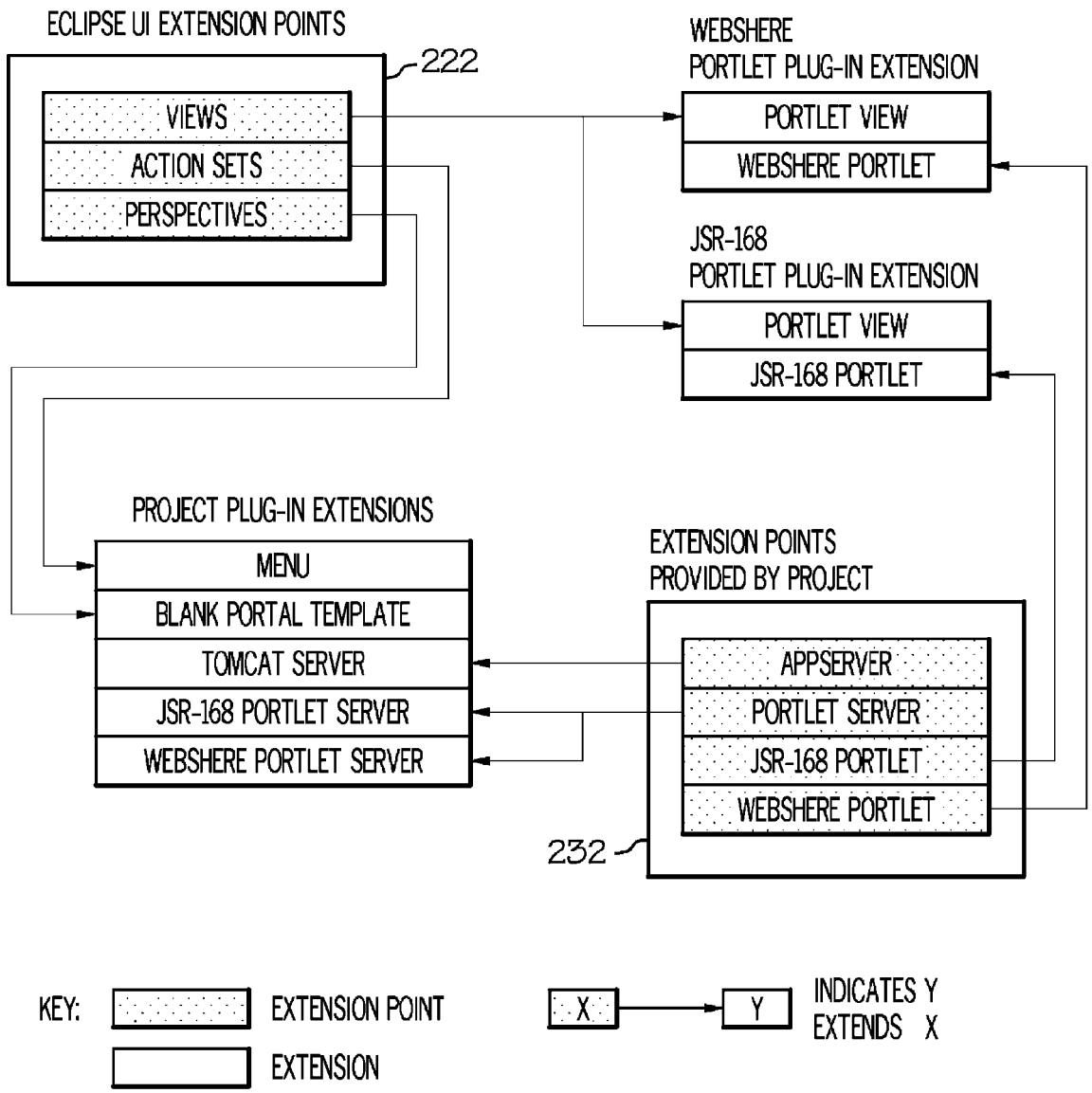
FIG. 2c shows the interrelationship of extension points and extensions of a client computer system according to an embodiment.

As shown in FIG. 2c, the client computer system 100 comprises a plurality of UI extensions which are plugged in to Workbench extension points 222 of the Eclipse Platform, and Server extensions, which are plugged into server extension points 232 declared by the Project plug-in 110.

Referring to FIGS. 2a and 2b, the platform runtime process will now be described. First of all, the Eclipse platform starts up; reading the manifest files of its registered plug-ins, building its in-memory plug-in registry; and initiating its registered plug-ins. Thus the project plug-in 110 is initiated and is thus available to be used with the Eclipse platform. Also, any registered portlet view plug-ins 202 are initiated by the platform. Nothing special happens yet to the portal servers 204a, 204b until a user displays a page containing a view of a portlet or installs a new portlet.

When a user selects a perspective to be displayed which includes a view of a portlet, the associated plug-in must obtain the portlet's markup content and it makes a call to retrieve this. First it calls an interface object for that portlet type to see whether the relevant portlet server 204a, 204b has been started up. If the portlet server has not been started up the portlet interface 203a, 203b tells the application server 201 (via the API 205) to start the relevant portlet server 204a, 204b. When the portlet server starts up all of its installed portlets 206 will be initialized. The portlet view plug-in 202 associated with the auctioned portlet contains a parameter identifying the portlet instance to which it is associated. The portlet view tool creates a view window in which a web browser is run, and makes a query to the portlet instance via the server API passing the id of the portlet instance and the required mode. The portlet server returns the URL and the view passes it to the embedded browser 207. The browser 207 sends the URL request to the application server 201 via HTTP and receives a response including the markup rendered by the portlet. The browser 207 then displays the portlet content according to the received markup. The portlet may contain links to other pages, documents etc, and if a user selects any of these, the linked markup is retrieved by the browser using HTTP.

Interaction between the browser 207 and the portlet server, 204a or 204b, continues as the user interacts with the portlet 206. Portlet mode or state change requests, for example: Edit, Configure or Help mode, are initiated by the user clicking on one of the control icons in the window frame or skin of a portlet view. The portlet view tool then executes the UI Action Handler 212 which notifies the portlet interface 214 of the auctioned view as to which control button has been selected. The portlet interface 214 passes to the web browser the URL from which the view should request new content. The web content received from that URL enables the browser to display the portlet 206 in the requested mode/state.

Figure 3A:
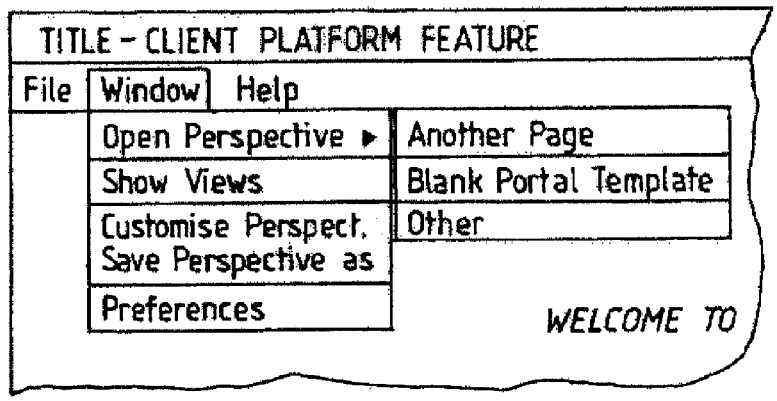
FIGS. 3a, 3b, and 3c show screen shots of display pages or portions of display pages that may be displayed according to an embodiment of the invention.
Figure 3B:
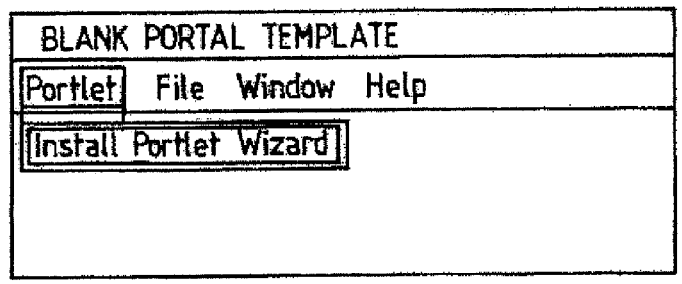
Figure 3C:
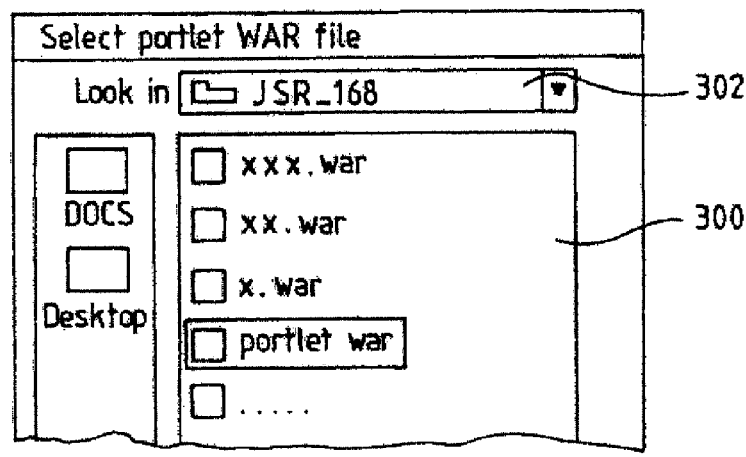

Installation of a portlet will now be described from a visual point of view, with reference to FIGS. 3a, 3b, and 3c. On startup of the platform 200, a welcome perspective will be displayed, typically with a control bar/button from which an option such as 'open blank portal template' can be selected, as shown in FIG. 3a. The blank portal template is a tool, (implemented as an extension 213 of a 'perspectives' extension point of the Eclipse UI), which allows a user to create new perspectives and install portlets using an install portlet wizard (see FIG. 3b). On selection of the install portlet wizard 209, the user is presented (see FIG. 3c) with a file list 300 of portlet web application archive (.war) files in a particular folder 302 of the client system 100. If the user selects one or more portlets from this list, the .war file of each selected portlet will be installed by the wizard onto the relevant portlet server. (A single .war file can include a plurality of portlets and the user may be able to select particular portlets within a single .war file for installation). When each selected portlet has been installed the wizard presents a successful installation report to the user, who may then have to restart the client platform to use the newly installed portlets, depending on the particular platform being used. The wizard also provides a client platform view for each installed portlet, and this mechanism will be described in more detail later. These views are thus added to the platform's list of available views, which shows all view extensions, and which a developer or user can use to design new display pages such as new perspectives.

Figure 4A:
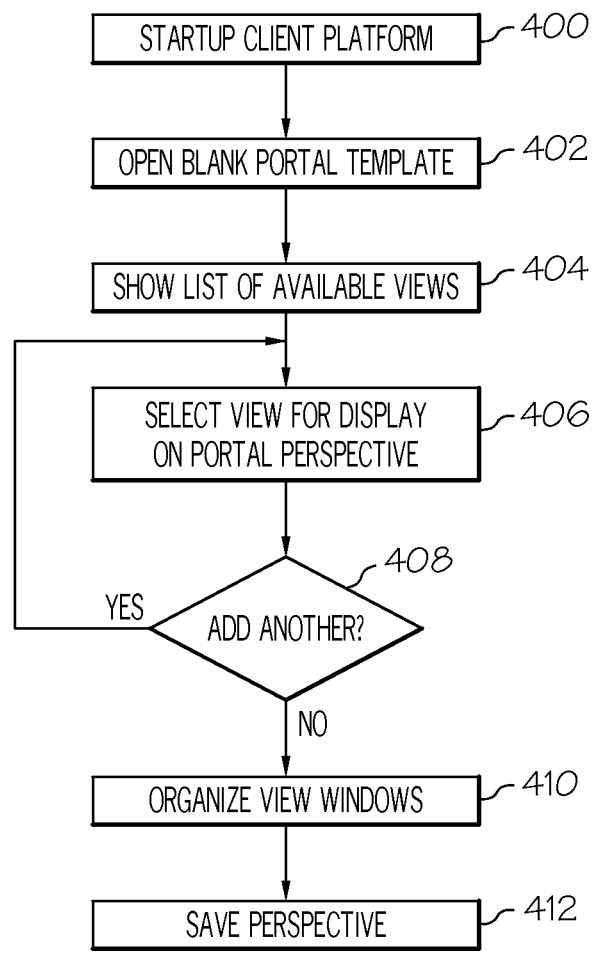
FIG. 4a shows the steps involved in designing a display page according to an embodiment of the invention.

Referring to FIG. 4a, to design a new perspective, on startup 400 the user is presented with a menu page (implemented as an extension of the Eclipse UI extension point 'ActionSets') from which the user can select and open 402 the blank portal template. The user selects a 'show view' option from a drop down menu of the template and is shown 404 a list of portlet views and/or client platform component views that are available. Selection of one of the listed views 406 results in that view being instantiated and opened in the current perspective. The user can add more views to the page being created and can organize 410 the views on the page through functions such as resizing, repositioning e.g. drag-and-drop, etc., and can design a perspective which shows views of non-portlet client platform components alongside views of portlets, as shown in FIG. 1. The created perspective can be saved to a list of predefined perspectives 412 which can be recalled as and when needed, in a similar manner to switching to a new page in a portal. When the perspective is closed the views on the perspective will also be closed.

Figure 4B:
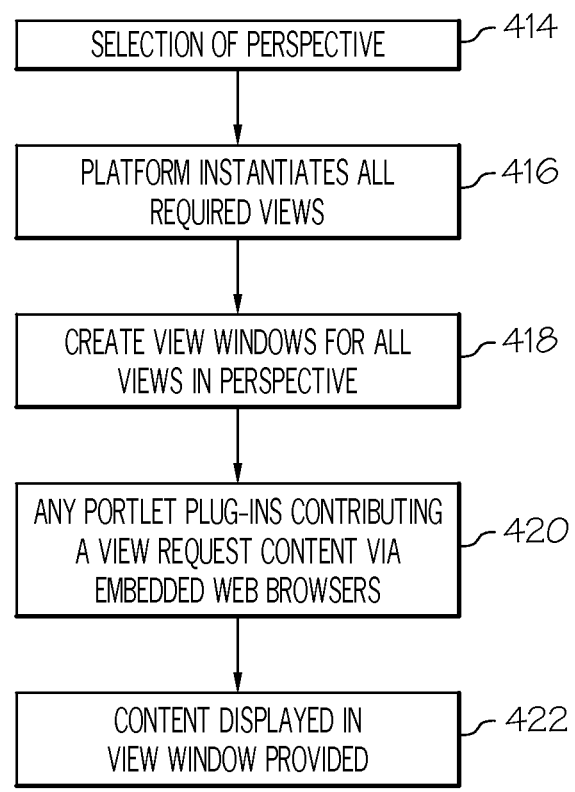
FIG. 4b shows the steps involved in displaying a stored display page according to an embodiment of the invention.

Referring to FIG. 4b, when a user requires to display a stored perspective, the required perspective is selected 414 from the drop-down menu under the 'Open perspective' option. The platform 200 then instantiates 416 all the plug-ins having views which are part of the selected perspective and reads their manifest files. From the information in the manifest files the platform uses the portlet view tool to create 418 the frames and any necessary tool bars and menus for each view window and to embed a web browser into each instantiated portlet view. For views contributed by portlet view plug-ins, each relevant plug-in is activated and sends 420 a request for the content of its associated portlet via the embedded web browser. The request goes to the application server which directs it on to the relevant portlet server. (In doing this the application server determines the correct container to process the request by examining the request URL and looking up a mapping table to its containers e.g. the portlet servers.) The perspective is then displayed 422 to the user with any portlet views showing the content received via the embedded web browsers.

The user may then interact with any of the displayed views. If the user interacts with a portlet view for example by clicking on a URL link displayed in the view, the embedded web browser requests the content having that URL from the portlet server via HTTP. The URL addresses a single portlet. The portlet server returns only html content from the addressed portlet, and this is then displayed by the embedded web browser. The rest of the views on the perspective are not refreshed.

Figure 5:
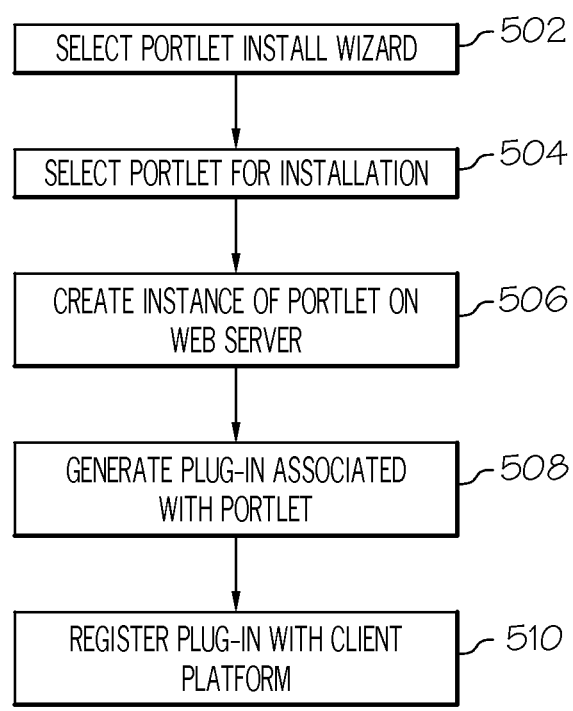
FIG. 5 shows the steps involved in the installation of a portlet according to an embodiment of the invention.

Referring to FIG. 5, the functional steps involved in the installation of a portlet onto the application server will now be described. The Platform is provided with a portlet install wizard, component 209, which, when selected 502 by a user, provides a user interface which enables the user to select a particular portlet war file, from a list of war files. A war (web application archive) file is the normal packaging for a portlet. In response to user selection of a portlet 504, the install wizard 209 determines the portlet type from the war file and creates an instance of a portlet interface 203, initializing the relevant portlet server 204a, 204b if it is not already initialized. The install wizard 209, via the portlet interface 203a, 203b, instructs the portlet server 204a, 204b to install the portlet .war file 211, which results in a new instance 506 of the portlet 206 on the portlet server. In this process the portlet server installs the portlet file(s) and adds the portlet details to the registry of its portlet container which manages its portlets.

Upon successful installation of the portlet .war file 211, the install wizard 209 generates 508 a new portlet view plug-in 202 associated with that portlet and including its own manifest file. The manifest file lists the display labels (e.g. title of plug-in view), controls and extensions required by the view plug-in, as well as declaring two extensions: a view extension of the Eclipse UI view extension point; and a JSR-168 or WebSphere portlet interface extension 214 which extends the JSR-168 or WebSphere portlet extension points 232 provided by the project plug-in 110. The portlet interface extension enables the portlet to declare which type of portlet it is associated with, and references code, contained in the relevant portlet server component 204a, 204b, for providing the relevant portlet server interface 203a, 203b. The view extension references the standard portlet view code which the portlet view plug-in runs when the view is to be displayed to a user. Using this the portlet view tool creates the required menus and toolbars and apply the icons provided by the tool to a frame for the portlet view. Once the portlet view plug-in is registered 510 with the Eclipse platform, a user may add a view of the new portlet to an Eclipse perspective, as described above.

The arrangement differs from that of a portlet instance in a server-side portal in that the portal server 204 in the present system does not aggregate the content from a plurality of portlets into a portal page. Instead each portlet has its own portlet view window which can be displayed on the user's Eclipse platform screen. Moreover, the portal server does not package each portlet content fragment into a portlet window adding a frame, including title and control buttons, to each window. Instead, the portlet view tool provides the frame of its portlet view window, including a title bar and control buttons, according to the portlet view plug-in manifest.

For each portlet installed, a new portlet view plug-in is installed on the Eclipse platform by the install wizard. The Eclipse platform displays each portlet view plug-in in a separate window, or View, each with its own frame, control buttons and embedded web browser.

An embodiment of the invention thus allows an unmodified portlet to run inside a window on a rich client platform with control of the portlet being moved from the portlet markup to the client UI. From the user's point of view, there is no difference between a portlet and any other client side application. A user can interact with the portlet in exactly the same way as they would have interacted with it had it been deployed as a server side portlet. Portlets can be installed into the client platform using a simple wizard system and removed similarly. Thus, client side support for portlets is provided, allowing them to be run locally in a rich client environment, removing the need for a separate server and network connections.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Further, an article of manufacture including such a computer program is also envisaged as an aspect of the present invention.

A computer program for implementing various functions or for conveying information may be supplied on media such as one or more DVD/CD-ROMs and/or floppy disks and then stored on a hard disk, for example. A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fiber link or any other suitable carrier medium for a telecommunications system.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A software tool for installing a portlet in a client computer system with at least one portlet server, the tool being operable to:
provide data identifying one or more files each containing at least one portlet;
in response to selection of a single portlet from one of the identified files for installation:
instruct a portlet server to install only the selected single portlet; and after the installation of the selected single portlet, to generate a portlet view tool only associated with the selected single portlet, the portlet view tool, associated with the selected single portlet, being operable to run an embedded web browser for displaying only content from the selected single portlet in a view window, and to control only the selected single portlet; and
generate a portlet view plug-in including a manifest file, wherein the manifest file lists at least one display label, at least one control, and at least one extension required by the portlet view plug-in.

2. The software tool according to claim 1, for use on a computer system running a client platform, further operable to register the generated portlet view tool with the client platform.

3. The software tool according to claim 2, further operable to store a list of views available on the client computer system and to update this list when the generated portlet view tool is registered with the client platform.

4. The software tool according to claim 1, wherein the manifest file declares two extensions including a view extension and a portlet interface extension.

5. The software tool according to claim 4, wherein the portlet interface extension declares a type of portlet it is associated with and referenced code in a relevant portlet server component for providing a relevant portlet server interface.

6. The software tool according to claim 4, wherein the view extension references a standard portlet view code for the portlet view plug-in to run when a view is displayed to a user.

7. A computer program product for installing a portlet on a client computer system, comprising computer-implementable instructions provided on a computer readable storage medium for carrying out the steps of:
providing a portlet server for processing requests for portlet content;
in response to user selection of a single portlet, installing only the selected portlet on a portlet server; and after the installation of the single selected portlet:
generating a portlet view tool associated only with the selected single portlet, the portlet view tool, associated with the selected single portlet, being operable to run an embedded web browser for displaying only content from the selected single portlet in a view window, and to control only the selected single portlet; and
generating a portlet view plug-in including a manifest file, wherein the manifest file lists at least one display label, at least one control, and at least one extension required by the portlet view plug-in.

8. A data processing system comprising:
a computer processor; and
a software tool for installing a portlet in a client computer system with at least one portlet server, the tool, when executed by the processor, being operable to:

provide data identifying one or more files each containing at least one portlet;

in response to selection of a single portlet from one of the identified files for installation:

instructing a portlet server to install only the selected single portlet; and after the installation of the selected single portlet:

generate a portlet view tool associated only with the selected portlet, the portlet view tool, associated with the selected single portlet, being operable to run an embedded web browser for displaying only content from the selected single portlet in a view window, and to control only the selected single portlet; and generate a portlet view plug-in including a manifest file, wherein the manifest file lists at least one display label, at least one control, and at least one extension required by the portlet view plug-in.

* * * * *